United States Patent
Perumalla et al.

(10) Patent No.: US 12,353,971 B1
(45) Date of Patent: Jul. 8, 2025

(54) MACHINE LEARNING MODEL ADAPTATION VIA SEGMENT REPLACEMENT AND STUDENT-TEACHER TRAINING

(71) Applicant: Amazon Technologies, Inc., Seattle, WA (US)

(72) Inventors: Poorna Chand Srinivas Perumalla, Seattle, WA (US); Nagajyothi Nookula, Seattle, WA (US); Long Gao, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1066 days.

(21) Appl. No.: 16/219,704

(22) Filed: Dec. 13, 2018

(51) Int. Cl.
| | |
|---|---|
| *G06N 20/20* | (2019.01) |
| *G06F 17/11* | (2006.01) |
| *G06N 3/084* | (2023.01) |
| *G06N 5/046* | (2023.01) |
| *H04L 67/60* | (2022.01) |

(52) U.S. Cl.
CPC .......... *G06N 20/20* (2019.01); *G06F 17/11* (2013.01); *G06N 3/084* (2013.01); *G06N 5/046* (2013.01); *H04L 67/60* (2022.05)

(58) Field of Classification Search
None
See application file for complete search history.

(56) References Cited

U.S. PATENT DOCUMENTS

| | | | |
|---|---|---|---|
| 10,210,860 B1 * | 2/2019 | Ward | G06N 3/044 |
| 10,713,754 B1 * | 7/2020 | Wang | G06N 3/04 |
| 11,100,398 B2 * | 8/2021 | Kish | G06N 3/063 |
| 11,537,439 B1 * | 12/2022 | Liberty | G06F 9/5077 |
| 11,593,609 B2 * | 2/2023 | Desoli | G06N 3/04 |
| 11,675,943 B2 * | 6/2023 | Boesch | G06N 3/045 |
| | | | 716/102 |
| 11,681,649 B2 * | 6/2023 | Talpes | G06F 7/5443 |
| | | | 382/156 |
| 2015/0100530 A1 * | 4/2015 | Mnih | G06N 3/08 |
| | | | 706/25 |
| 2016/0217369 A1 * | 7/2016 | Annapureddy | G06N 3/082 |
| 2016/0358070 A1 * | 12/2016 | Brothers | G06N 3/045 |
| 2017/0132528 A1 * | 5/2017 | Aslan | G06N 20/00 |
| 2018/0032857 A1 * | 2/2018 | Lele | G06N 3/084 |
| 2018/0075343 A1 * | 3/2018 | van den Oord | G06F 40/44 |
| 2018/0098233 A1 * | 4/2018 | Talari | H04L 41/069 |
| 2018/0276489 A1 * | 9/2018 | Xu | G06V 10/82 |

(Continued)

*Primary Examiner* — Richa Sonifrank
(74) *Attorney, Agent, or Firm* — Nicholson De Vos Webster & Elliott LLP

(57) ABSTRACT

Techniques for machine learning (ML) model adaptation via segment replacement and student-teacher training are described. A model optimizer determines that a ML model sought to be deployed to an edge device includes a source segment that is not supported by the edge device. The model optimizer identifies a replacement segment that is equivalent to the source segment, constructs an adapted ML model by swapping in the replacement segment for the source segment, and trains the adapted ML model, optionally from the source ML model using a student-teacher training procedure. The trained adapted ML model is then deployed to the edge device, where it can be successfully run with minimal (if any) degradation of performance compared to the original source ML model.

18 Claims, 9 Drawing Sheets

(56) References Cited

U.S. PATENT DOCUMENTS

| | | | |
|---|---|---|---|
| 2018/0336479 A1* | 11/2018 | Guttmann | G06V 10/764 |
| 2019/0251440 A1* | 8/2019 | Kasiviswanathan | G06N 3/08 |
| 2019/0378015 A1* | 12/2019 | Lin | G06N 3/082 |
| 2020/0175334 A1* | 6/2020 | Zhang | G06F 18/217 |

* cited by examiner

MACHINE LEARNING MODEL ADAPTATION VIA SEGMENT REPLACEMENT AND STUDENT-TEACHER TRAINING

BACKGROUND

With recent advancements in machine learning (ML), a natural next step is to deploy models on "edge" devices in various environments, such as "smart" cameras, mobile devices, smart speakers, toys, within motor vehicles, etc. This configuration can have the potential to allow inferences to be generated quicker (e.g., on a same device that obtains the data upon which the inference is generated, instead of remotely-such as in a cloud network or other centralized location) and enable faster reactions to these inferences to occur.

However, the hardware available to generate inferences (e.g., processing units such as central processing units (CPUs), graphical processing units (GPUs), tensor processing units (TPUs), field programmable gate arrays (FGPAs), etc., the amounts and types of available memory, etc.) and the architectures of these hardware resources (e.g., instruction set architectures (ISAs) such as x86, ARM, MIPS, SPARC) vary significantly from one edge device to another. Particularly, in many cases the set of hardware resources offered by an edge device are severely constrained due to a need to be low-powered and/or inexpensive, which creates a difficulty in being able to run sophisticated or large ML models. Further, new ML models are continually being developed that often rely on new types of operations or libraries, even further reducing the ability of typical edge devices to make practical use of these models.

BRIEF DESCRIPTION OF DRAWINGS

Various embodiments in accordance with the present disclosure will be described with reference to the drawings, in which.

DETAILED DESCRIPTION

Figure 1:
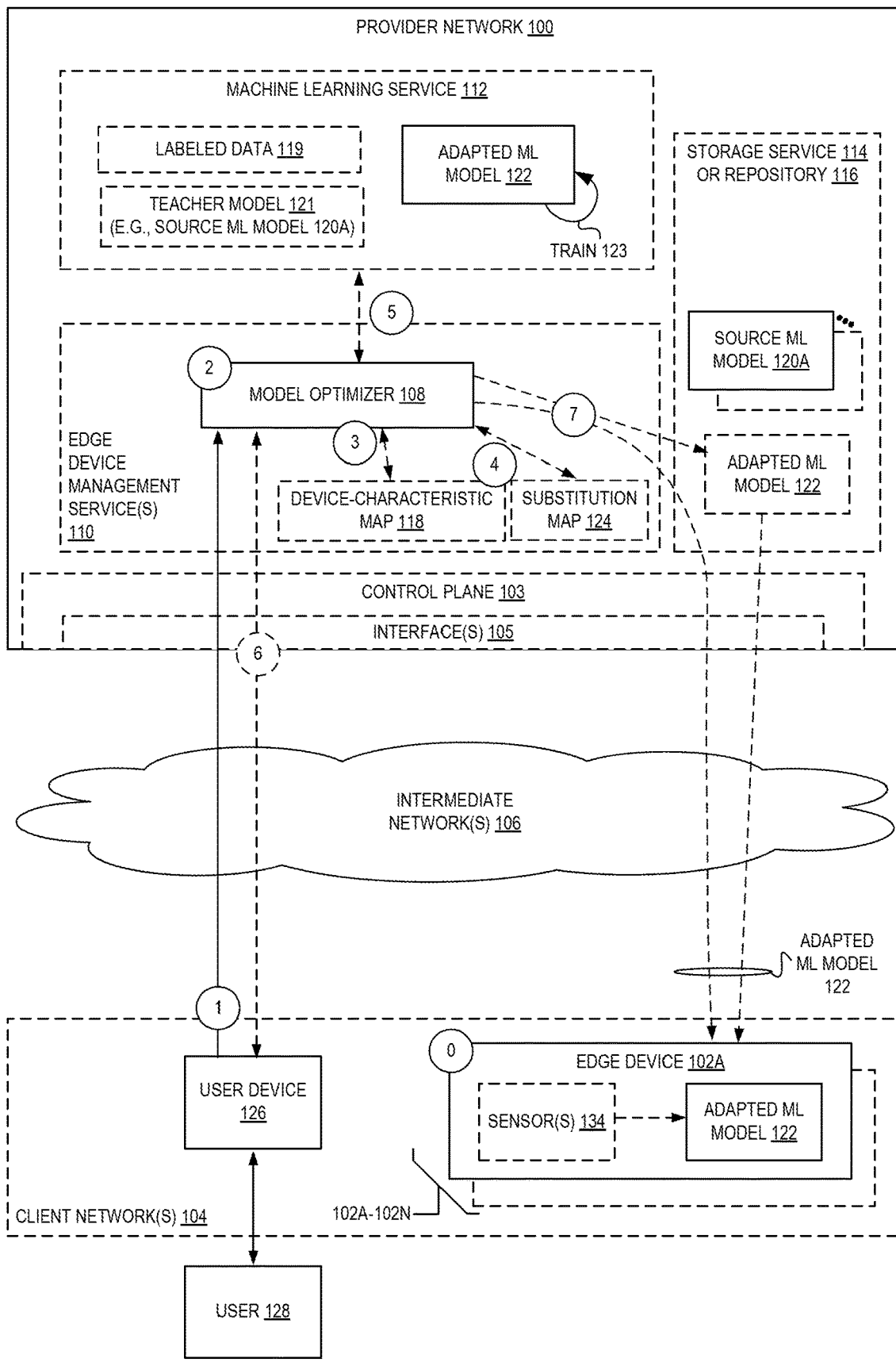
FIG. 1 is a diagram illustrating an environment for ML model adaptation via segment replacement and student-teacher training according to some embodiments.

Various embodiments of methods, apparatus, systems, and non-transitory computer-readable storage media for ML model adaptation via segment replacement and student-teacher training are described. According to some embodiments, a model optimizer adapts a ML model sought to be deployed to a particular electronic device so that it can be executed by the electronic device. The model optimizer identifies the existence of any problematic aspects of the ML model (e.g., layers, operators, or other characteristics such as instruction types or data formats) that cause it to be inoperable or not performant upon the particular electronic device, identifies replacement segments for the problematic aspects that perform in a same or similar manner, and creates an adapted ML model by substituting the replacement segments into the ML model for the problematic aspects. The model optimizer then trains the adapted ML model, e.g., using a student-teacher training technique to transfer the "knowledge" of the original model (or even a different model) to the adapted ML model. The trained adapted ML model can then be provided to the electronic device, which can execute it efficiently despite not being able to execute the original ML model adequately. Embodiments can thus allow for a ML model to be adapted to be executable by an electronic device without any (or, without substantial) degradation in performance ability (e.g., accuracy of inference).

As indicated herein, the field of machine learning (and the specific category of deep learning) is developing extremely quickly. Many people and organizations are looking to machine learning to improve system availability through predictive maintenance, provide entirely new experiences on behalf of their customers, enable lower costs through automation, etc. In some cases, Internet of Things (IoT) type devices—which are commonly referred to as being part of a class of "edge" devices (that typically operate outside of a data center or cloud network)—are poised to play a central role in driving these improvements as running machine learning becomes more efficient and edge hardware capabilities continue to accelerate.

However, successfully implementing machine learning at the edge in a sustainable and manageable way is elusive. First, due to their size, machine learning models are cumbersome to manage and deploy reliably. As a result, many types of models are rarely deployed to edge devices, lessening the likelihood of continually improving capabilities through the re-training of models. Second, many original equipment manufacturers (OEMs) and partners invest significant resources in developing hardware-specific optimizations to achieve adequate performance, and then have to hand-tune models for their specific environment. This can take many months and requires extremely deep knowledge of both hardware and machine learning. This problem is magnified at the rapid pace of research in ML, where new models, layers, operators, etc., are continually developed and often result in "new" ML models employing these new aspects being unable to be run on existing edge devices that do not have explicit hardware support and/or underlying software support (e.g., via a ML framework) for these aspects. Moreover, as it is important for ML models running inference to be extremely efficient (e.g., to execute quickly due to a large amount of data requiring inference), deploying models to edge devices becomes extremely difficult when the edge devices have heterogeneous and/or constrained hardware resources—e.g., the existence or non-existence of CPU cores, GPUs, FPGAs, etc., differing architectures (x86, ARM, etc.), different resource amounts and availabilities (e.g., amounts of random access memory (RAM)), etc.

Specifically, ML models are trained for a specific objective such as image classification, language transcription, and so on. These models are typically trained on individual or groups of devices having substantial amounts of computational resources, such as devices using GPUs and/or TPUs, to speed up the training and to create models having better precision and accuracy. These models may then be deployed on to different edge devices based on the particular use cases. However, the deployment of the models is decoupled from the training process—that is, while training the model, specific edge platforms for deployment are not considered. Because of this disconnect between model training and deployment, the models may not run optimally (or at all) on edge devices due to various mismatches between the model and the device's capabilities, such as reduced operator coverage provided by the edge devices compared to those used by the models, reduced compute capabilities of the edge devices, datatype incompatibility between datatypes of the models and those supported by the edge devices, etc. Embodiments disclosed herein can address these and other issues.

FIG. 1 is a diagram illustrating an environment for ML model adaptation via segment replacement and student-teacher training according to some embodiments. FIG. 1 shows a model optimizer 108 of a provider network 100 that adapts ML models for deployment to edge devices in a manner that ensures the edge devices are able to run the models efficiently without significantly affecting the performance (e.g., accuracy, precision) of these models.

The model optimizer 108 may be implemented as one or more software modules executed by one or more computing devices of the provider network 100 and may be a component of another service such as an edge device management service 110 that can manage the operation of edge devices 102A-102N located outside the provider network 100. Generally, a provider network 100 provides users 128 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and/or other computing resources may be provided as services, such as a hardware virtualization service that can execute compute instances, a storage service 114 that can store data objects, etc. The users 128 (or "customers") of provider networks 100 may utilize one or more user accounts that are associated with a customer account, though these terms may be used somewhat interchangeably depending upon the context of use. Users 128 may interact with a provider network 100 (e.g., using a user device 126) across one or more intermediate networks 106 (e.g., the internet) via one or more interface(s) 105, such as through use of application programming interface (API) calls, via a console implemented as a website or application, etc. The interface(s) 105 may be part of, or serve as a front-end to, a control plane 103 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance, e.g., by submitting code to be executed by the provider network, which in turn utilizes a compute instance to execute the code (typically without the user having any control of or knowledge of the underlying compute instance(s) involved).

As shown at circle (0), one or more edge devices 102A-102N may be set up in an environment such as a client network 104. Each of the edge devices 102A-102N may be an electronic device with processing resources that can be used to execute applications or code such as a ML model (e.g., via a ML framework). The edge devices 102A-102N may include one or more sensors 134, such as an optical sensor, microphone, humidity sensor, temperature sensor, accelerometer, touch sensor, or other hardware-implemented sensor, which may generate data that can be used as input data for a ML model. For example, an edge device 102A may be a device with a camera and may execute a ML model to perform object detection, classification, segmentation, etc. As another example, an edge device 102A may be a device with a microphone and may execute a ML model to perform speech or sound recognition.

As part of this set up, the user 128 may optionally install or configure software applications of the edge devices 102A-102N that serves to connect the edge devices 102A-102N to an edge device management service 110 of a provider network 100. This software may serve to securely "extend" a provider network 100 to the edge devices 102A-102N so they can act locally on the data they generate, while still using the provider network 100 for management, analytics, durable storage, etc. For example, a user 128 may install or configure software on the edge devices 102A-102N and "register" these devices with an edge device management service 110, where the user 128 may create and test device software (such as, or including, a ML model) in the provider network, and then deploy it to the edge devices 102A-102N.

At circle (1), the user 128 (via user device 126, such as a personal computer (PC), laptop, mobile device, etc.) may cause a message to be sent to the model optimizer 108 that indicates a request to deploy a ML model to one (or more) of the edge devices 102A-102N. The message may be carried by a HyperText Transfer Protocol (HTTP) request message, and may be received at a web service endpoint of the provider network 100. The message may identify a particular ML model—or source ML model 120A—sought to be deployed to the edge device(s). For example, the message may include an identifier of a source ML model 120A from a repository 116 of models made available in the provider network 100. As another example, the message may include an identifier of a storage location (e.g., of a storage service 114) where the source ML model 120A is located. The message may further identify the user 128 (e.g., via an identifier of an account associated with the user 128, such as a customer account) and may identify the one or more edge devices 102A-102N that the user 128 desires the source ML model 120A to be deployed to (e.g., via one or more identifiers of the installed/configured software applications).

At circle (2), the model optimizer 108 may obtain the identified source ML model 120A and identify characteristics of the model, such as what its particular type is (e.g., a Convolutional Neural Network (CNN)), what type(s) of components make up the model (e.g., the numbers and/or types of the model's layers or operators), code/execution characteristics of the model (e.g., particular instruction types, required precision), etc.

Figure 2:
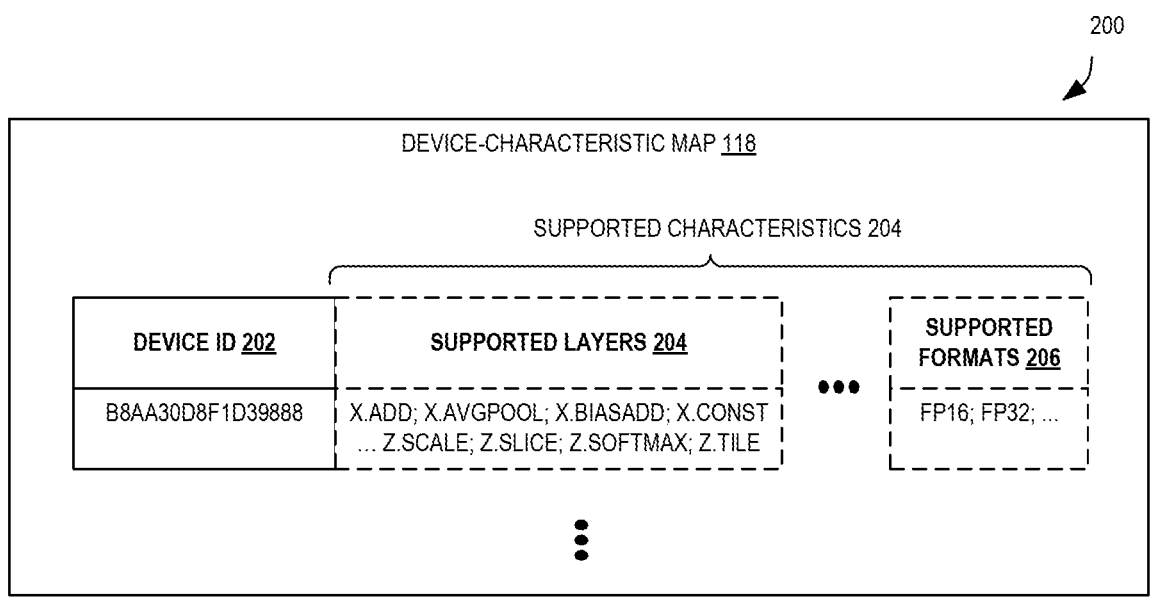
FIG. 2 is a diagram illustrating an exemplary device-characteristic map and an exemplary substitution map used for ML model adaptation via segment replacement and student-teacher training in some embodiments.
Figure 2:
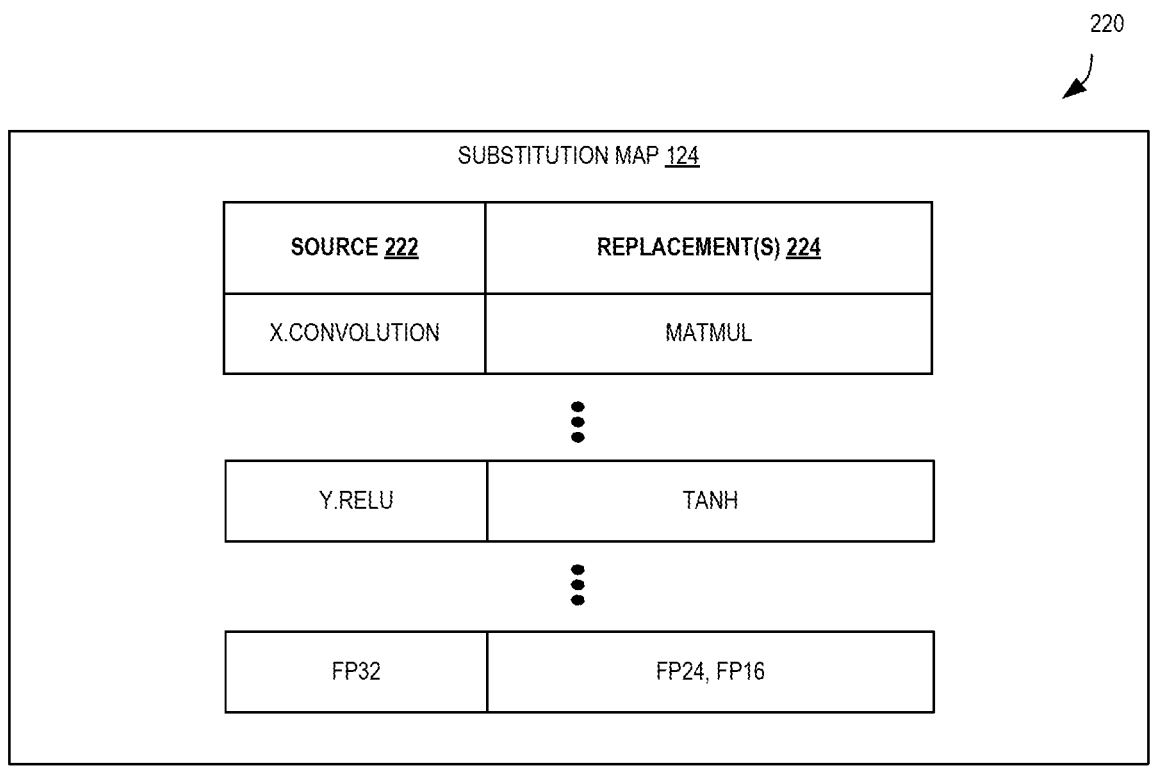

At circle (3), the model optimizer 108 may obtain a set of supported characteristics for each of the one or more edge devices 102A-102N, which may include performing a lookup in a device-characteristic map 118 data structure (e.g., a database, an array, etc.). One simple example of a device-characteristic map 118 is shown in FIG. 2, which is a diagram illustrating an exemplary device-characteristic map 118 (at 200) and an exemplary substitution map 124 (at 220) used for ML model adaptation via segment replacement and student-teacher training in some embodiments. As shown, the device-characteristic map 118 may include an entry for each edge device that has been registered (e.g., with the edge device management service 110), and may include a device identifier 202 (here shown as a hex representation of a 16-byte value) and one or more sets of device characteristics 204. The one or more sets of device characteristics 204 may, in many cases, be provided by a manufacturer or provider of an edge device, or be ascertained through an exploration/testing of the capabilities of the particular device type.

In this example, the device characteristics 204 may include a set of machine learning layers 204 that the device (e.g., via a software ML framework of the device that executes models) supports. The illustrated set of machine learning layers 204 includes a number of identifiers of layers—e.g., a value of "X.ADD" may indicate that the device supports a particular framework referred to as "X" and an "ADD" layer of that framework; similarly, a value of "Z.SOFTMAX" indicates that the device supports a particular framework referred to as "Z" and a "SOFTMAX" layer of that framework.

Figure 3:
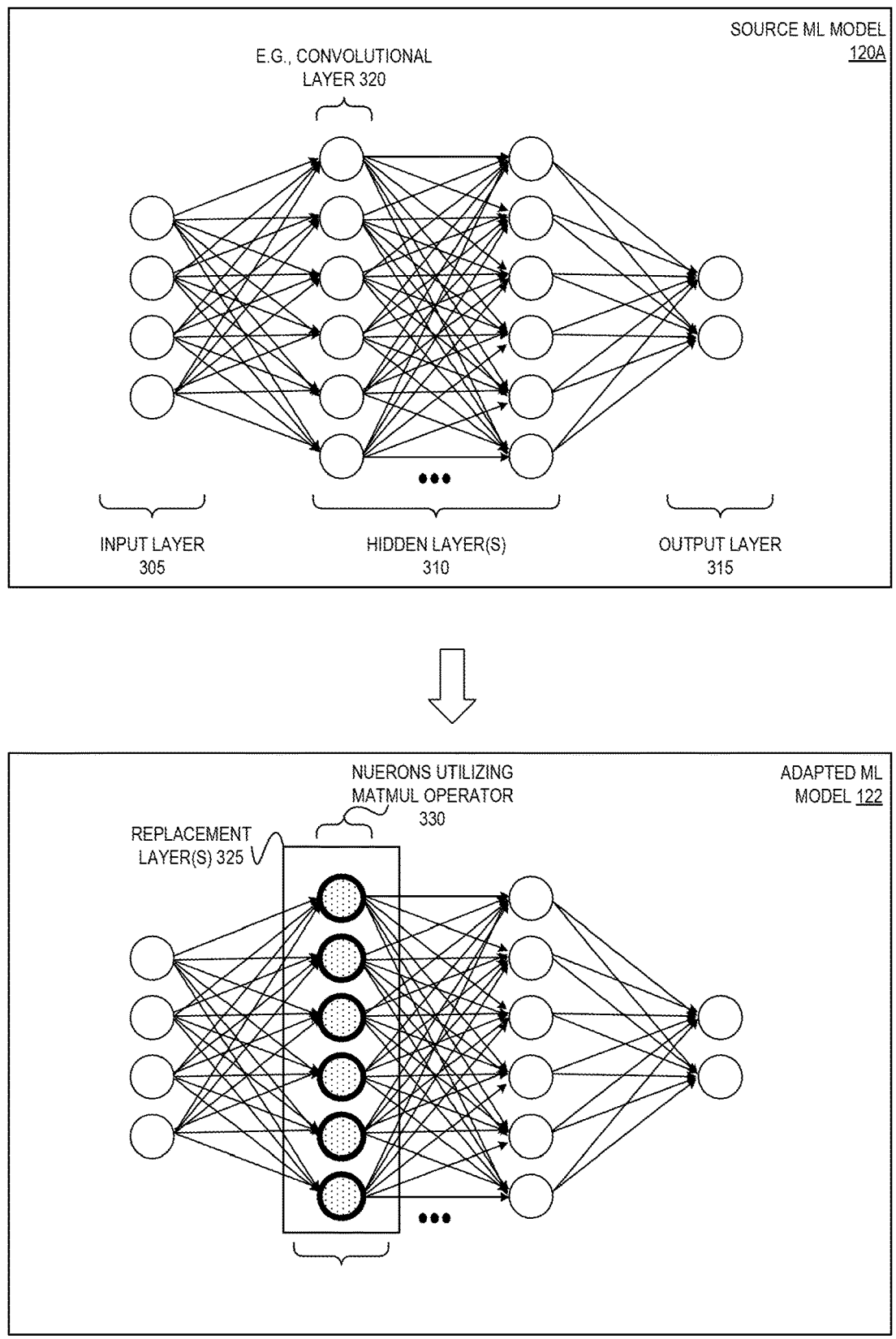
FIG. 3 is a diagram illustrating logical architectures of an exemplary source ML model and an exemplary adapted ML model according to some embodiments.

As is known those of skill in the art, many machine learning models such as neural networks are made up of multiple "layers" of neurons that utilize operators. For example, FIG. 3 is a diagram illustrating logical architectures of an exemplary source ML model 120A and an exemplary adapted ML model 122 according to some embodiments. As shown by the exemplary source ML model 120A architecture, the model may include a number of layers such as an input layer 305 including four neurons, one or multiple "hidden" layers 310 such as a convolutional layer 320 with various numbers of neurons, and an output layer 315 here shown with two neurons. Of course, many other types of model architectures may exist and thus this example is provided as simply one example of limitless numbers of architectures. For example, various other numbers or types of layers or operators may be utilized, such as a densely-connected layer, a dropout layer, a batch normalization layer, an instance normalization layer, an embedding layer, a flattening layer, a concatenation layer, a convolutional layer, a deconvolutional layer, a pooling layer (e.g., performing a max pooling operation, an average pooling operation, a global max pooling operation, etc.), an activation layer such as a rectified linear activation layer (or "Relu" layer), a product operation, an element-wise square operator, a padding operator, and/or many other types of layers and operators.

Turning back to FIG. 2, the set of supported characteristics 204 may also include one or more supported format 206 types indicating what precision/datatypes/value types are supported by the device. For example, the illustrated supported format 206 values include "FP16" (for half precision or 16-bit floating point, which is a binary floating-point computer number format that occupies 16 bits) and "FP32" (for 32-bit floating point). As is known to those of skill in the art, in many ML models the weights of the network may be represented in FP32 as such numbers have a sufficient range and precision for many ML applications, and many processing resources support 32-bit floating point instructions natively.

Now turning back to FIG. 1, after determining set of supported characteristics 204 of the edge device(s) at circle (3), the model optimizer 108 may determine whether the determined characteristics of the source ML model 120A (determined at circle (2)) are all supported by the edge device. For example, the model optimizer 108 may determine which, if any, of the characteristics of the source ML model 120A do not exist in the set of supported characteristics 204 of the edge device(s).

If all characteristics of the source ML model 120A do in fact exist in the set of supported characteristics 204 of the edge device(s), the source ML model 120A may be deployed to the edge device(s) 102A as-is (not illustrated) or with other modifications typically performed by the edge device management service 110.

However, when there are one or more characteristics of the source ML model 120A that are not supported, at circle (4) the model optimizer 108 can determine substitutions that it can use to "adapt" the source ML model 120A into an adapted ML model 122 that can be executed by the edge device(s). This determination may include performing one or more lookups in a substitution map 124 data structure, such as a database table, array, etc., to determine whether each of the non-supported characteristics can be substituted with a replacement 224 characteristic that is supported by the edge device (per the set of supported characteristics 204).

As shown in FIG. 2, the exemplary substitution map 124 may include a mapping between characteristics. In this example, a source 222 characteristic is associated with one or more replacement characteristics 224. As a first example, a source 222 characteristic of a convolutional layer ("X.CONVOLUTION") is associated with a replacement 224 characteristic of a matrix multiplication operator ("MATMUL"). As a second example, a source 222 characteristic of a Relu layer ("Y.RELU") is associated with a replacement 224 characteristic of a hyperbolic tangent operator ("TANH"). As a third example, a source 222 characteristic of "FP32" is associated with a replacement 224 characteristic of either "FP24" or "FP16."

The associations indicated in the substitution map 124 can be determined via an analysis or study of the source characteristics to find exact or similar replacements. For example, a similar (but lossy) replacement of code using FP32 instructions can be made to code using analogous FP16 instructions or FP24 instructions, though there may be some loss of performance of the resulting model. Similarly, as the operations of a convolutional layer essentially mirror the operations of a particular matrix multiplication operation, such a convolutional layer can be replaced with a matmul operation with either no or little apparent difference. Likewise, as the operations of a Relu layer almost exactly mirror the output of the hyperbolic tangent function, such a layer can be swapped with a layer with neurons utilizing the tanh operator, which will perform almost exactly the same as the Relu layer.

Turning back to FIG. 1, when one or more characteristics of the model that are not supported by the edge device are found by the model optimizer 108 to not have replacements that the edge device supports, the model optimizer 108 may cause a message to be sent (e.g., at optional circle (6)) to be presented to the user 128 indicating that the source ML model 120A may not be deployed to the edge device(s) 102, or that the source ML model 120A can be deployed but may likely suffer from poor or non-performance.

However, when all characteristics of the model that are not supported by the edge device are found by the model optimizer 108 to have replacements that the edge device supports, the model optimizer 108 may optionally indicate this to the user 128 (e.g., via a message sent at optional circle (6))—e.g., that the source ML model may not be supported by the device, but that one or more characteristics of the model can be replaced—and optionally seek confirmation to proceed.

The model optimizer 108 may then construct an adapted ML model 122 to be effectively the same as the source ML model 120A but with problematic source segments (corresponding to the source characteristics) replaced with corresponding replacement segments (corresponding to the replacement characteristics). As used herein, a "segment" may comprise a representation, within a model, of one or more layers, one or more operators, one or more instructions, etc. For example, in FIG. 3 the source ML model 120A may be analyzed by the model optimizer 108 to determine that a source segment (a convolutional layer 320) is not supported by the particular targeted edge device, but that this source segment convolutional layer can be replaced by a replacement segment—e.g., a replacement layer 325 with neurons utilizing a "matmul" operator 330 in as shown in adapted ML model 122.

As shown in FIG. 1, the model optimizer 108 at circle (5) may train 123 the adapted ML model 122, e.g., as a "student" to another model 121 (such as the source ML model 120A itself, or even another ML model that may be even more sophisticated) that acts as a "teacher" under a student-teacher training framework to effectively impart or transfer the knowledge of the teacher to the student. Such student-teacher training procedures, as is known to those of skill in the art, are typically used to "compress" a large machine learning model into a smaller one. However, embodiments disclosed herein can adapt the technique to instead be used to train an adapted model-which may be of similar size/complexity, may already have various model weights set, etc.—to effectively "smooth" out any differences in the two models, to thereby cause the adapted model to perform as similar as possible to the teacher model 121. To implement this training, in some embodiments the model optimizer 108 utilizes a machine learning service 112 of the provider network 100.

Figure 4:
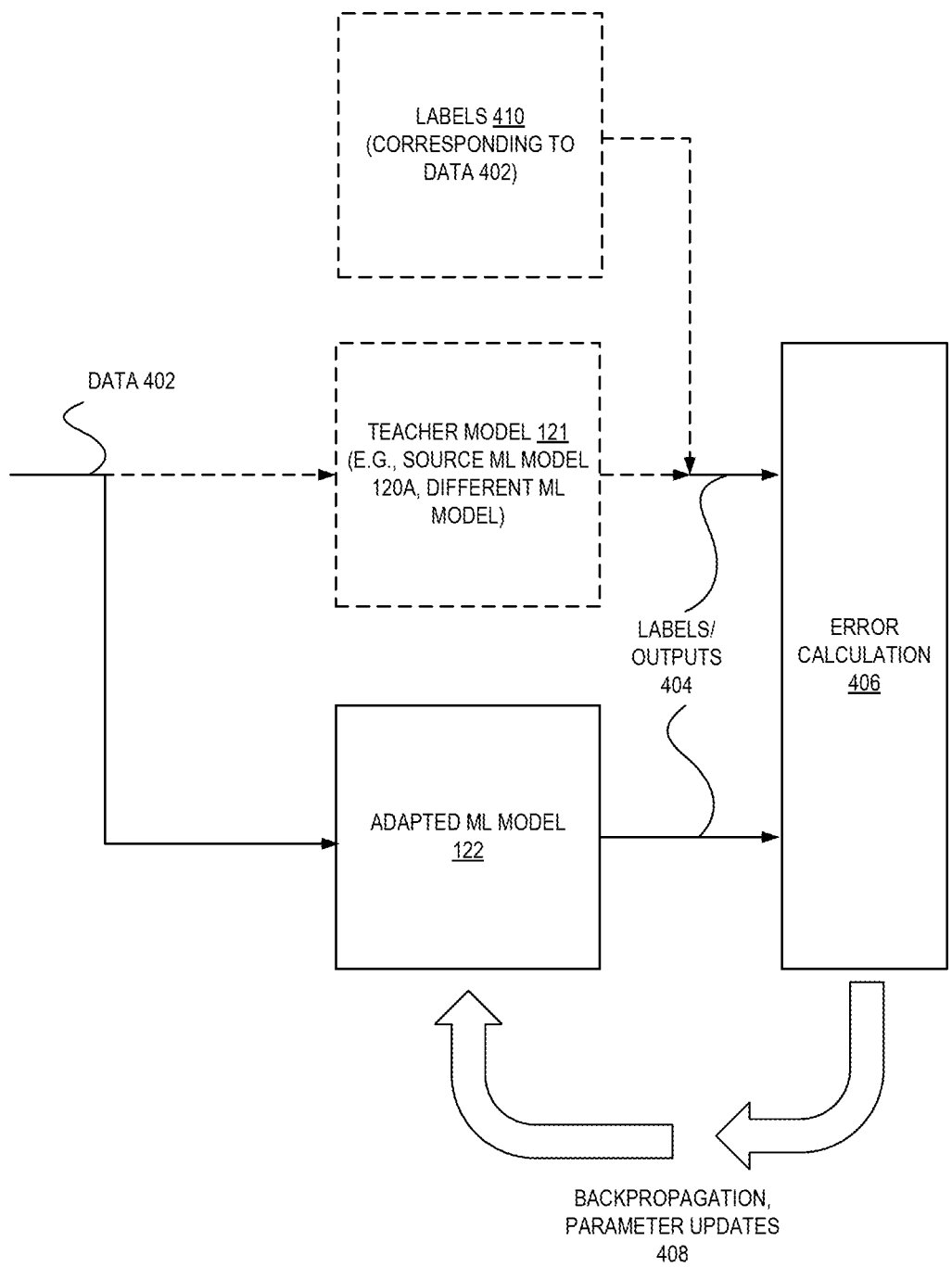
FIG. 4 is a diagram illustrating utilizing student-teacher training with a source ML model and adapted ML model according to some embodiments.

For example, FIG. 4 is a diagram illustrating utilizing student-teacher training with a teacher model 121 and adapted ML model 122 according to some embodiments. As shown, some training data 402 (e.g., some or all of the training data used to train the source ML model 120A—or even entirely different data) can be provided as input data to the teacher model 121 to generate inferences (here, outputs or labels 404). In some embodiments, the amount of training data may be significantly smaller than the amount used to originally train the teacher model 121. The same data may be provided to the adapted ML model 122 to generate its own inferences (again, outputs or labels 404). The results from each may be compared by an error calculation 406 block, and the error between the two can be backpropagated 408 to adjust the adapted ML model 122 weights/parameters, e.g., via an optimization algorithm such as gradient linear descent.

Alternatively, an alternatively training process of some embodiments involves using a set of labeled data 119 (that is, having labels/outputs 410 already determined for the data 402 elements, perhaps via a separate technique such as human annotators and/or other models), where the data 402 is similarly provided to the adapted ML model 122, and the difference(s) between the output of the adapted ML model 122 and the known labels can be used to train the adapted ML model 122 as described above with reference to the teacher-student training framework.

In some embodiments, in FIG. 1 at circle (7) the adapted ML model 122 is provided to the edge device(s) 102A for use. This deployment may occur in a variety of ways. For example, the edge device 102A may obtain the adapted model 122 from the storage service 114 and begin using it to perform inference. In some embodiments, the adapted model 122 may be stored in a location (e.g., specified in a training request issued by the model optimizer 108 at circle (5)) that is associated with the particular edge device 102A or user account, and the edge device 102A may monitor the storage location for the existence of a adapted model 122, be notified (e.g., by an edge device management service 110) to the existence of an adapted model 122, etc., and then download the adapted model 122. Thus, by specifying a particular destination location for the adapted model 122, the model optimizer 108 may thus cause the adapted model 122 to be deployed to the edge device 102A. Alternatively, the model optimizer 108 may store the adapted model 122 at the particular location of the storage service 114 that the edge device 102A monitors for changes (and then downloads), though in other embodiments the model optimizer 108 may be able to "push" the adapted model (or a message that a new model is available for download) to the edge device 102A.

Accordingly, cutting-edge ML models can now be deployed to the edge in a largely if not entirely automated manner. Thus, even though different edge devices have different compatibilities with different layers—e.g., and may not support de-convolutional layers, or Faster CNN (F-CNN) networks, or support 32-bit floating point instructions, etc.—many of these incompatibilities can be worked around without any substantial loss of performance.

Further, as research into ML models continues to evolve, and new operators continue to be developed, embodiments disclosed herein can be easily updated, e.g., by identifying and configuring new suitable replacements in a substitution map, to enable these operators, which is particularly important for edge devices that necessarily otherwise would need to optimize for layers and/or networks/models. Moreover, although some other systems could attempt to work around incompatible layers/operators (or code segments) by shifting certain layers/operators (or code segments) to different processors, in many cases—such as at the edge—this is not possible or practicable, though embodiments described herein can adapt the models regardless of the availability of heterogeneous processors.

Figure 5:
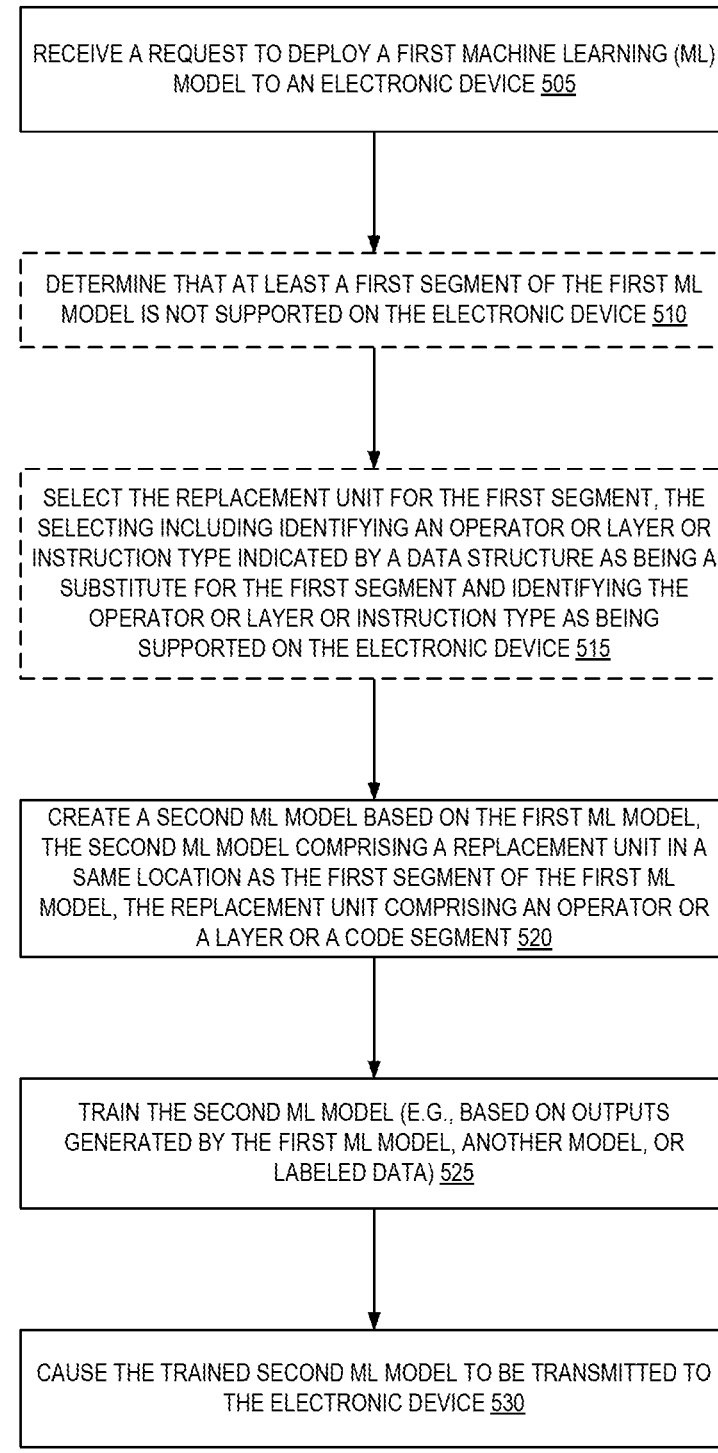
FIG. 5 is a flow diagram illustrating exemplary operations of a method for ML model adaptation via segment replacement and student-teacher training according to some embodiments.

FIG. 5 is a flow diagram illustrating exemplary operations 500 of a method for ML model adaptation via segment replacement and student-teacher training according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the model optimizer 108 of FIG. 1.

The operations 500 include, at block 505, receiving a request to deploy a first machine learning (ML) model to an electronic device. The request may be received at a web service endpoint of a provider network, and the electronic device may be an "edge" device located outside of the provider network.

The operations 500 optionally include, at block 510, determining that at least a first segment (e.g., a layer, an operator, a code portion) of the first ML model is not supported on the electronic device.

Optionally, at block 515 the operations 500 include selecting a replacement segment for the first segment, the selecting including identifying an operator or layer or instruction type indicated by a data structure as being a substitute for the first segment and identifying the operator or layer or instruction type as being supported on the electronic device. In some embodiments, the first segment comprises a convolutional layer and the replacement segment comprises a matrix multiplication operator. In some embodiments, the first segment comprises a rectified linear unit and the replacement segment comprises a hyperbolic tangent (tanh) operator.

The operations 500 include, at block 520, creating a second ML model based on the first ML model, the second ML model comprising a copy of portions of the first ML model with the replacement segment in place of the first segment. In some embodiments, the creating of the second ML model includes inserting a code segment in the second ML model utilizing a datatype or precision that differs from a corresponding datatype or precision of a corresponding code segment of the first ML model.

At block 525, the operations 500 include training the second ML model. The training may be based on using a teacher model such as the first ML model to train the second ML model using common input data and the outputs of the first ML model. The training may alternatively be based on use of another teacher model or based on labeled data elements. In some embodiments, block 525 includes utilizing an optimization algorithm with backpropagation to adjust weights of neurons of the second ML model. In some embodiments, the optimization algorithm is gradient linear descent.

The operations 500 include, at block 530, causing the trained second ML model to be transmitted to the electronic device.

In some embodiments, the operations 500 further include sending a first message destined to a second electronic device indicating that the first layer is not supported on the electronic device and receiving a second message originated by the second electronic device indicating an approval to replace the first layer.

In some embodiments, the electronic device includes an optical sensor; the first ML model implements one of a detection model, a segmentation model, or a classification model; and the trained second ML model operates on data generated by the optical sensor.

Figure 6:
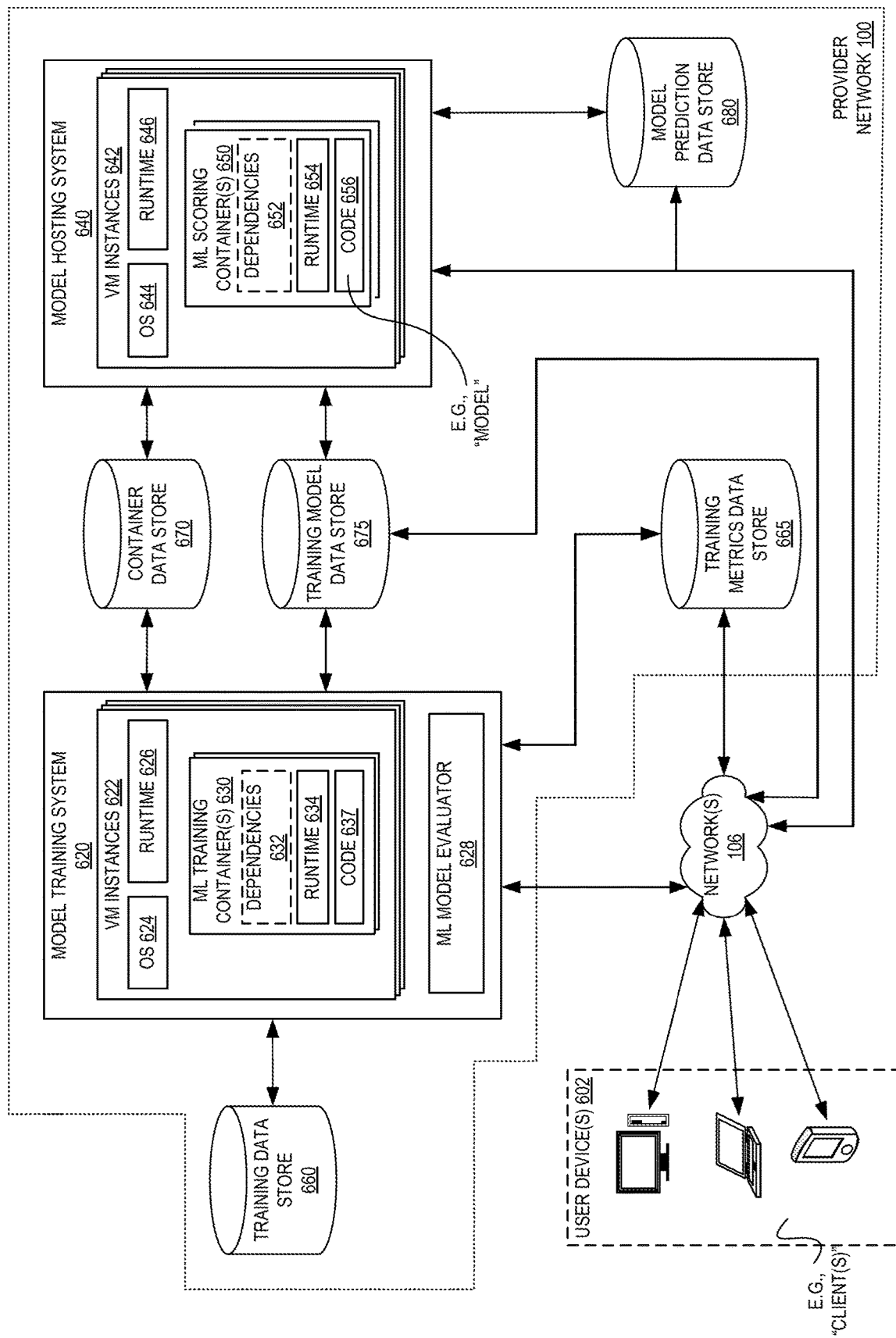
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602 (e.g., a PC or mobile device such as user device 126, or even an edge device 102), a model training system 620, a model hosting system 640, a training data store 660, a training metrics data store 665, a container data store 670, a training model data store 675, and a model prediction data store 680. A machine learning service 112 described herein may include one or more of these entities, such as the model hosting system 640, model training system 620, etc.

In some embodiments, users, by way of user devices 602, interact with the model training system 620 to provide data that causes the model training system 620 to train one or more machine learning models. A machine learning model, generally, may be thought of as one or more equations that are "trained" using a set of data. In some embodiments, the model training system 620 provides ML functionalities as a Web service, and thus messaging between user devices 602 and the model training system 620 (or provider network 100), and/or between components of the model training system 620 (or provider network 100), may utilize HTTP messages to transfer data in a machine-readable file format, such as extensible Markup Language (XML) or JavaScript Object Notation (JSON).

The user devices 602 can interact with the model training system 620 via frontend 629 of the model training system 620. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 620 packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided-perhaps as part of a training request (or referenced in a training request)—to the model training system 620, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 620 can retrieve the container image from the indicated location and create a container using the retrieved container image. The container is then loaded into a virtual machine instance 622 for training a machine learning model, as described in greater detail below.

The model training system 620 can use the information provided by the user device 602 to train a machine learning model in one or more pre-established virtual machine instances 622 in some embodiments. In particular, the model training system 620 includes a single physical computing device or multiple physical computing devices that are interconnected using one or more computing networks (not shown), where the physical computing device(s) host one or more virtual machine instances 622. The model training system 620 can handle the acquisition and configuration of compute capacity (e.g., containers, instances, etc., which are described in greater detail below) based on the information describing the computing machine on which to train a machine learning model provided by the user device 602. The model training system 620 can then train machine learning models using the compute capacity, as is described in greater detail below. The model training system 620 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (e.g., the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training. Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 620 uses one or more container images included in a training request (or a container image retrieved from the container data store 670 in response to a received training request) to create and initialize a ML training container 630 in a virtual machine instance 622. For example, the model training system 620 creates a ML training container 630 that includes the container image(s) and/or a top container layer.

Prior to beginning the training process, in some embodiments, the model training system 620 retrieves training data from the location indicated in the training request. For example, the location indicated in the training request can be a location in the training data store 660. Thus, the model training system 620 retrieves the training data from the indicated location in the training data store 660. In some embodiments, the model training system 620 does not retrieve the training data prior to beginning the training process. Rather, the model training system 620 streams the training data from the indicated location during the training process. For example, the model training system 620 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 620 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 620 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 620 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 620 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 620 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 620 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 620 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 620 can significantly reduce the training time in some embodiments.

In some embodiments, the model training system 620 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 620 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 620 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 620 can modify the machine learning model accordingly. For example, the model training system 620 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 620 can cause the virtual machine instance 622 to modify the execution of code stored in an existing ML training container 630 according to the data provided in the modification request. In some embodiments, the user, via the user device 602, can transmit a request to the model training system 620 to stop the machine learning model training process. The model training system 620 can then instruct the virtual machine instance 622 to delete the ML training container 630 and/or to delete any model data stored in the training model data store 675.

As described below, in some embodiments, the model data stored in the training model data store 675 is used by the model hosting system 640 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 620 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 640, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 640 includes a single physical computing device or multiple physical computing devices that are interconnected using one or more computing networks (not shown), where the physical computing device(s) host one or more virtual machine instances 642. The model hosting system 640 can handle the acquisition and configuration of compute capacity (e.g., containers, instances, etc.) based on demand for the execution of trained machine learning models. The model hosting system 640 can then execute machine learning models using the compute capacity, as is described in greater detail below. The model hosting system 640 can automatically scale up and down based on the volume of execution requests received from user devices 602 via frontend 649 of the model hosting system 640, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted or "inferred" results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 640 uses one or more container images included in a deployment request (or a container image retrieved from the container data store 670 in response to a received deployment request) to create and initialize a ML scoring container 650 in a virtual machine instance 642. For example, the model hosting system 640 creates a ML scoring container 650 that includes the container image(s) and/or a top container layer.

As described above, a user device 602 can submit a deployment request and/or an execution request to the model hosting system 640 via the frontend 649 in some embodiments. A deployment request causes the model hosting system 640 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 640 initializes ones or more ML scoring containers 650 in one or more hosted virtual machine instance 642. In embodiments in which the deployment request includes an identification of one or more container images, the model hosting system 640 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 640 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 640 further forms the ML scoring container(s) 650 by retrieving model data corresponding to the identified trained machine learning model(s)

in some embodiments. For example, the deployment request can identify a location of model data file(s) stored in the training model data store 675. In embodiments in which a single model data file is identified in the deployment request, the model hosting system 640 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 640 unarchives or decompresses the model data file to obtain multiple individual files and inserts the individual files into the ML scoring container 650. In some embodiments, the model hosting system 640 stores the model data file in the same location as the location in which the model data file was stored in the ML training container 630 that generated the model data file. For example, the model data file initially was stored in the top container layer of the ML training container 630 at a certain offset, and the model hosting system 640 then stores the model data file in the top container layer of the ML scoring container 650 at the same offset.

In embodiments in which multiple model data files are identified in the deployment request, the model hosting system 640 retrieves the identified model data files from the training model data store 675. The model hosting system 640 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 640 associates the initialized ML scoring container(s) 650 with the endpoint identified in the deployment request. For example, each of the initialized ML scoring container(s) 650 can be associated with a network address. The model hosting system 640 can map the network address(es) to the identified endpoint, and the model hosting system 640 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 640 via the frontend 649, where the execution request identifies an endpoint and includes an input to a machine learning model (e.g., a set of input data). The model hosting system 640 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 640 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 640 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 620, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, or the like.

The model training system 620 and the model hosting system 640 depicted in FIG. 6 are not meant to be limiting. For example, the model training system 620 and/or the model hosting system 640 could also operate within a computing environment having a fewer or greater number of devices than are illustrated in FIG. 6. Thus, the depiction of the model training system 620 and/or the model hosting system 640 in FIG. 6 may be taken as illustrative and not limiting to the present disclosure. For example, the model training system 620 and/or the model hosting system 640 or various constituents thereof could implement various Web services components, hosted or "cloud" computing environments, and/or peer-to-peer network configurations to implement at least a portion of the processes described herein. In some embodiments, the model training system 620 and/or the model hosting system 640 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 620. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 640. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 620 and the model hosting system 640, this is not meant to be limiting. For example, in some embodiments not shown, the training data store 660 is located internal to at least one of the model training system 620 or the model hosting system 640.

In some embodiments, the training metrics data store 665 stores model metrics. While the training metrics data store 665 is depicted as being located external to the model training system 620 and the model hosting system 640, this is not meant to be limiting. For example, in some embodiments not shown, the training metrics data store 665 is located internal to at least one of the model training system 620 or the model hosting system 640.

The container data store 670 stores container images, such as container images used to form ML training containers 630 and/or ML scoring containers 650, that can be retrieved by various virtual machine instances 622 and/or 642. While the container data store 670 is depicted as being located external to the model training system 620 and the model hosting system 640, this is not meant to be limiting. For example, in some embodiments not shown, the container data store 670 is located internal to at least one of the model training system 620 and the model hosting system 640.

The training model data store 675 stores model data files. In some embodiments, some of the model data files are comprised of a single file, while other model data files are packages of multiple individual files. While the training model data store 675 is depicted as being located external to the model training system 620 and the model hosting system 640, this is not meant to be limiting. For example, in some embodiments not shown, the training model data store 675 is located internal to at least one of the model training system 620 or the model hosting system 640.

The model prediction data store 680 stores outputs (e.g., execution results) generated by the ML scoring containers 650 in some embodiments. While the model prediction data store 680 is depicted as being located external to the model training system 620 and the model hosting system 640, this is not meant to be limiting. For example, in some embodiments not shown, the model prediction data store 680 is located internal to at least one of the model training system 620 and the model hosting system 640.

While the model training system 620, the model hosting system 640, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the one or more network(s) 106.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 620 and/or the model hosting system 640 provides the user devices 602 with one or more user interfaces, command-line interfaces (CLI), application programing interfaces (API), and/or other programmatic interfaces for submitting training requests, deployment requests, and/or execution requests. In some embodiments, the user devices 602 can execute a stand-alone application that interacts with the model training system 620 and/or the model hosting system 640 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
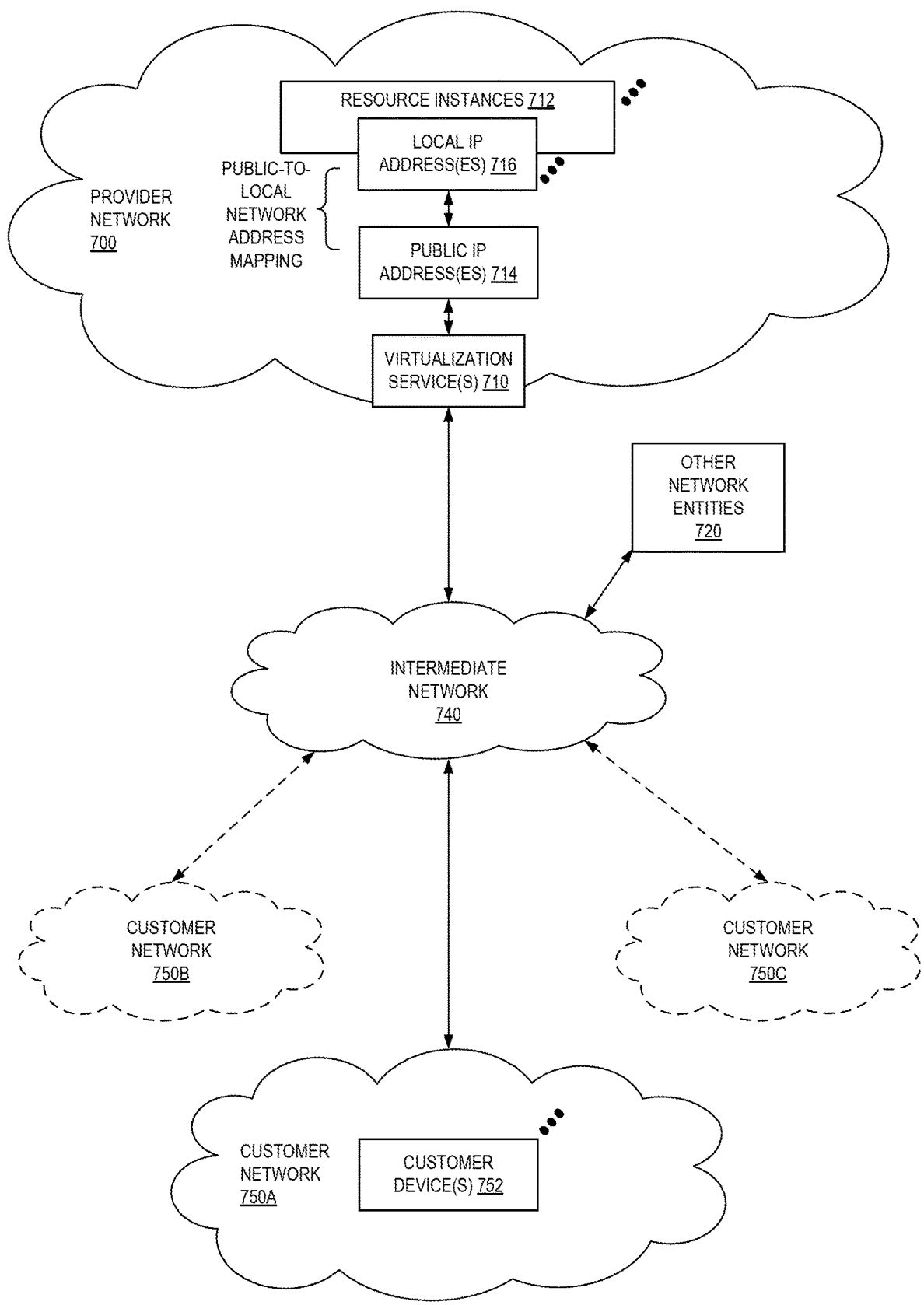
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
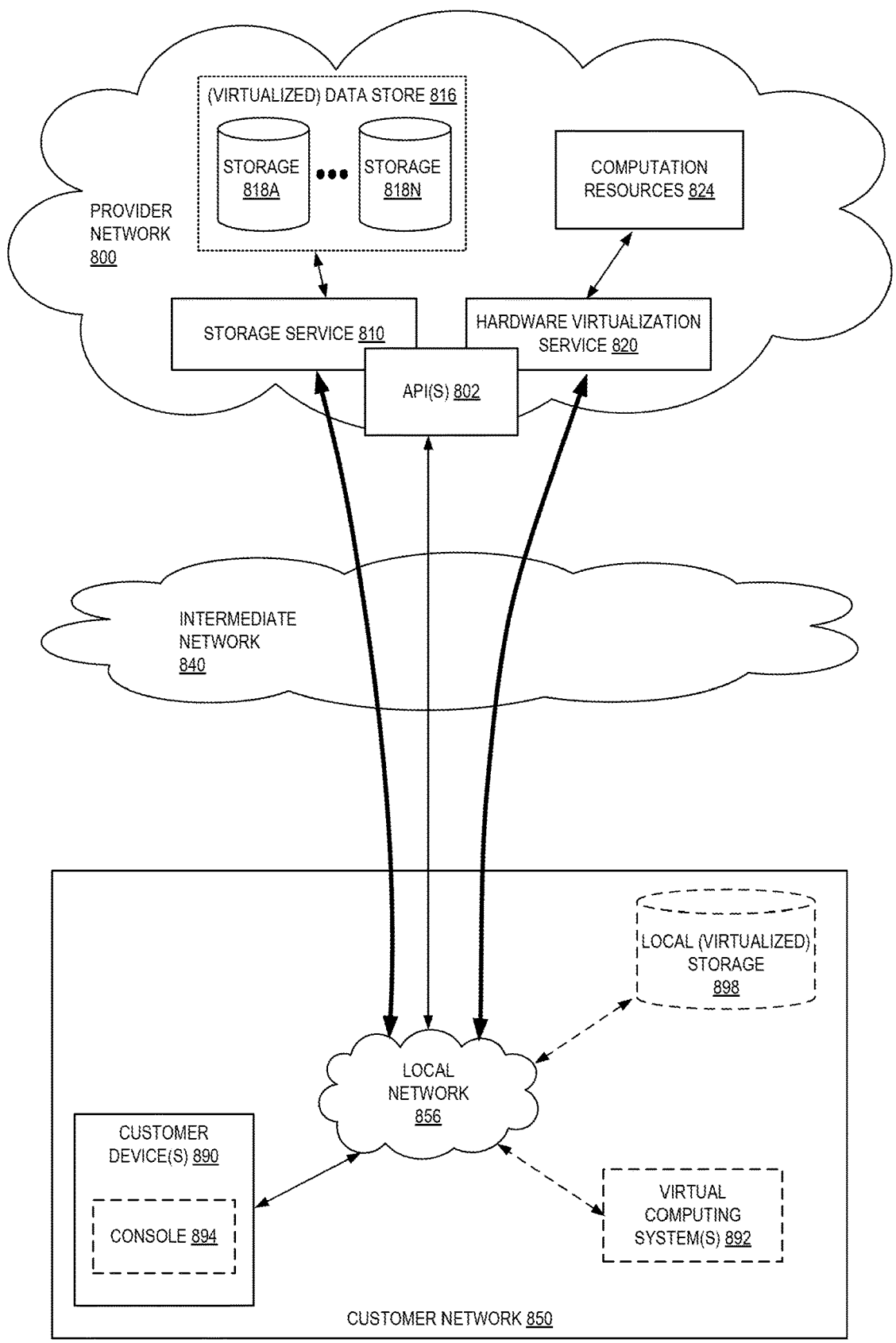
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
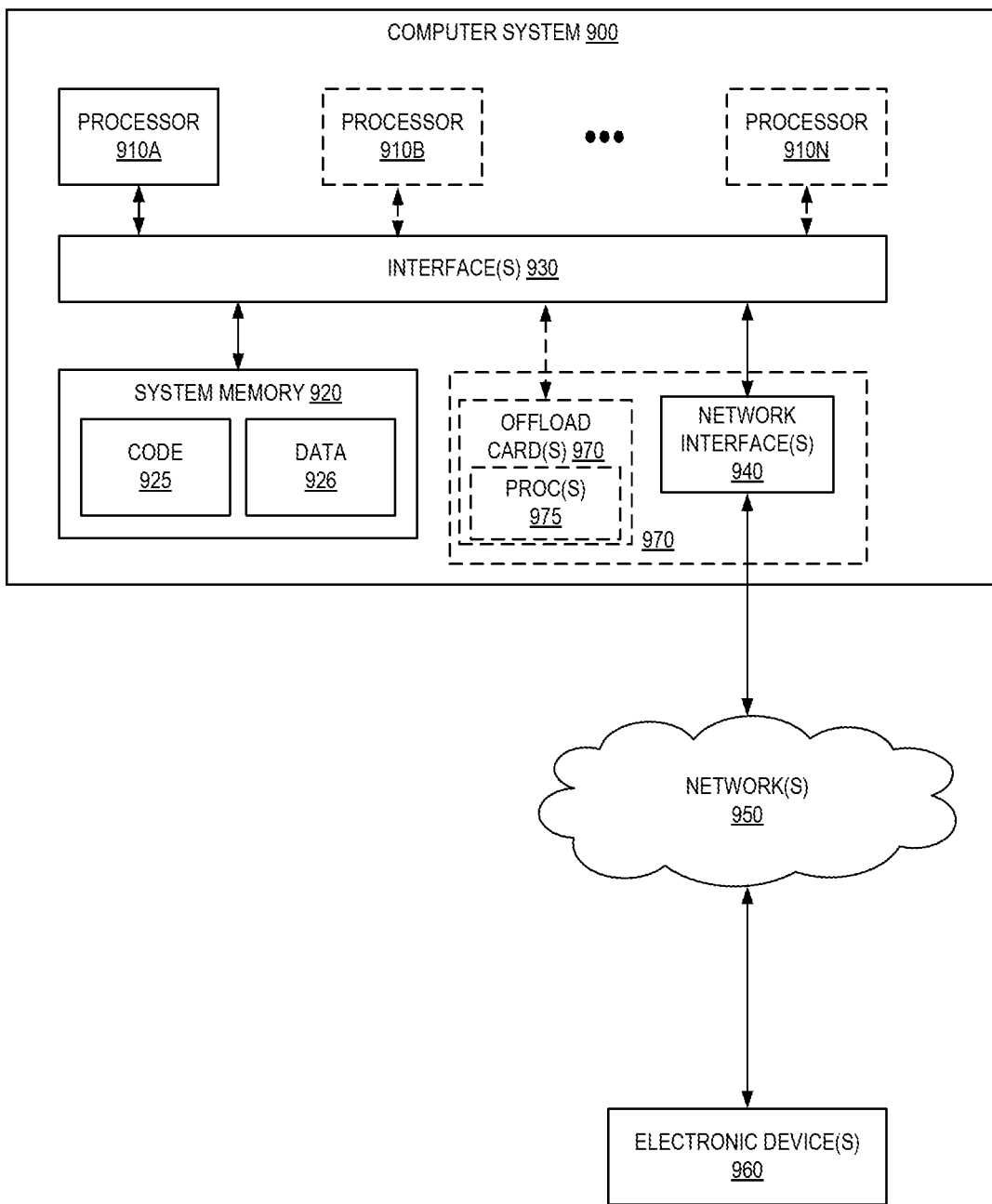
FIG. 9 is a block diagram illustrating an example computer system that may be used in some embodiments.

In some embodiments, a system that implements a portion or all of the techniques for ML model adaptation via segment replacement and student-teacher training as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a web service endpoint of a provider network, a request to deploy a first machine learning (ML) model to a first electronic device located outside the provider network;
   determining that at least a first convolutional layer of the first ML model is not supported on the first electronic device;
   selecting a replacement operator for the first convolutional layer, wherein selecting the replacement operator for the first convolutional layer is based on accessing one or more mapping data structures to determine that the replacement operator is a substitute for the first convolutional layer and is supported by the first electronic device, wherein a mapping data structure of the one or more mapping data structures maps a source characteristic of the first convolutional layer to a replacement characteristic of the replacement operator, and wherein the source characteristic is an operational characteristic of one of a convolutional layer, a deconvolutional layer, a ReLU (rectified linear unit) activation function, a 32-bit floating point instruction, or an F-CNN (faster convolutional neural network);

based on determining that the first ML model is not supported on the first electronic device, creating a second ML model that is supported on the first electronic device, the second ML model including one or more layers of the first ML model but with the replacement operator in place of the first convolutional layer;

training the second ML model based on a first set of inference outputs generated by the first ML model;

wherein training the second ML model comprises:
  utilizing the first ML model to generate the first set of inference outputs from a set of input data elements;
  utilizing the second ML model to generate a second set of inference outputs from the set of input data elements; and
  updating weights of the second ML model based on a comparison of corresponding pairs of the first set of inference outputs and the second set of inference outputs; and causing the trained second ML model to be transmitted to the first electronic device.

2. The computer-implemented method of claim 1, wherein the replacement operator comprises a matrix multiplication operator.

3. The computer-implemented method of claim 1, wherein training the second ML model based on the first set of inference outputs generated by the first ML model utilizes an optimization algorithm with backpropagation to adjust weights of neurons of the second ML model.

4. A computer-implemented method comprising:
  receiving a request to deploy a first machine learning (ML) model to a first electronic device;
  determining an incompatibility of the first electronic device with respect to the first ML model, wherein determining the incompatibility of the first electronic device comprises determining a first convolutional layer of the first ML model is not supported on the first electronic device;
  selecting a replacement operator for the first convolutional layer, wherein selecting the replacement operator for the first convolutional layer is based on accessing one or more mapping data structures to determine that the replacement operator is a substitute for the first convolutional layer and is supported by the first electronic device, wherein a mapping data structure of the one or more mapping data structures maps a source characteristic of the first convolutional layer to a replacement characteristic of the replacement operator, and wherein the source characteristic is an operational characteristic of one of a convolutional layer, a deconvolutional layer, a ReLU (rectified linear unit) activation function, a 32-bit floating point instruction, or an F-CNN (faster convolutional neural network);
  based on determining the incompatibility of the first electronic device, creating a second ML model that is compatible with the first electronic device, the second ML model comprising the replacement operator in a same location as the first convolutional layer of the first ML model;
  training the second ML model based on a first set of inference outputs generated by the first ML model;
  wherein training the second ML model comprises:
    utilizing the first ML model to generate the first set of inference outputs from a set of input data elements;
    utilizing the second ML model to generate a second set of inference outputs from the set of input data elements; and
    updating weights of the second ML model based on a comparison of corresponding pairs of the first set of inference outputs and the second set of inference outputs; and
  causing the trained second ML model to be transmitted to the first electronic device.

5. The computer-implemented method of claim 4, wherein training the second ML model comprises:
  utilizing the first ML model to generate the first set of inference outputs for one or more input data elements, the teacher model comprising the first ML model or another ML model;
  generating a second set of inference outputs using the second ML model for the one or more input data elements; and
  updating weights of the second ML model based on a comparison of corresponding pairs of the first set of inference outputs and the second set of inference outputs.

6. The computer-implemented method of claim 4, wherein the first layer comprises a convolutional layer and the replacement operator of the second ML model comprises a matrix multiplication operator.

7. The computer-implemented method of claim 4, wherein the first layer of the first ML model comprises a rectified linear unit layer and the replacement operator of the second ML model comprises a hyperbolic tangent (tanh) operator.

8. The computer-implemented method of claim 4, wherein the request is received at a web service endpoint of a provider network, and wherein the first electronic device is located outside of the provider network.

9. The computer-implemented method of claim 4, wherein training the second ML model utilizes an optimization algorithm with backpropagation to adjust weights of neurons of the second ML model.

10. The computer-implemented method of claim 4, further comprising:
  sending a first message destined to a third electronic device indicating that the first source segment of the first ML model is not supported on the first electronic device; and
  receiving a second message originated by the third electronic device indicating an approval to replace the first source segment of the first ML model.

11. The computer-implemented method of claim 4, wherein:
  the first electronic device includes an optical sensor;
  the first ML model implements one of a detection model, a segmentation model, or a classification model; and
  the trained second ML model operates on data generated by the optical sensor.

12. A system comprising:
  a first one or more electronic devices to implement a machine learning service of a provider network;
  a second one or more electronic devices to implement a model adaptation controller of the provider network, the model adaptation controller including instructions that upon execution cause the model adaptation controller to:
    receive a request to deploy a first machine learning (ML) model to a first electronic device;

determine that a first convolutional layer of the first ML model has an incompatibility with the first electronic device;

select a replacement operator for the first convolutional layer based on accessing one or more mapping data structures to determine that the replacement operator is a substitute for the first convolutional layer and is supported by the first electronic device, wherein a mapping data structure of the one or more mapping data structures maps a source characteristic of the first convolutional layer to a replacement characteristic of the replacement operator, and wherein the source characteristic is an operational characteristic of one of a convolutional layer, a deconvolutional layer, a ReLU (rectified linear unit) activation function, a 32-bit floating point instruction, or an F-CNN (faster convolutional neural network);

create, responsive to determining the incompatibility with the first electronic device, a second ML model that is compatible with the first electronic device, the second ML model comprising the replacement operator in a same location as the first convolutional layer of the first ML model, the replacement segment of the second ML model comprising an operator, a layer, or an instruction that is different than a corresponding operator, layer, or instruction of the first source segment of the first ML model;

train, via use of the machine learning service, the second ML model based on first set of inference outputs generated by the first ML model; and cause the trained second ML model to be transmitted to the first electronic device.

13. The system of claim 12, wherein the operator is mathematically equivalent to the first layer.

14. The system of claim 12, wherein the second ML model comprises an exact copy of the first ML model but with the replacement operator of the second ML model instead of the first layer of the first ML model.

15. The system of claim 12, wherein:
the first source layer of the first ML model comprises a convolutional layer and the replacement operator of the second ML model comprises a matrix multiplication operator; or
the first source layer of the first ML model comprises a rectified linear unit layer and the replacement operator of the second ML model comprises a hyperbolic tangent (tanh) operator.

16. The method of claim 1, further comprising:
determining that a source segment of the first ML model is not supported on a second electronic device, the source segment comprising an operator or an instruction;

creating a third ML model comprising a replacement segment in a same location as the source segment of the first ML model, the replacement segment of the third ML model comprising an operator or an instruction that is different than the operator or instruction of the source segment of the first ML model;

training the third ML model based on a second set of inference outputs generated by the first ML model; and causing the trained third ML model to be transmitted to the second electronic device.

17. The method of claim 4, further comprising:
determining an incompatibility of a second electronic device with respect to the first ML model;
wherein the incompatibility of the first electronic device is different in kind than the incompatibility of the second electronic device;
based on determining the incompatibility of the second electronic device, creating a third ML model that is compatible with the second electronic device, the third ML model comprising a replacement segment in a same location as a second source segment of the first ML model, the second source segment of the first ML model being a different segment than the first source segment of the first ML model, the replacement segment of the third ML model comprising an operator, a layer, or an instruction that is different than a corresponding operator, layer, or instruction of the second source segment of the first ML model;

training the third ML model based on a second set of inference outputs generated by the first ML model; and causing the trained third ML model to be transmitted to the second electronic device.

18. The system of claim 12, the model adaptation controller further including instructions that upon execution cause the model adaptation controller to:
determine an incompatibility of a second electronic device with respect to the first ML model;
wherein the incompatibility of the first electronic device is different in kind than the incompatibility of the second electronic device;
create, responsive to determining the incompatibility of the second electronic device, a third ML model that is compatible with the second electronic device, the third ML model comprising a replacement segment in a same location as a second source segment of the first ML model, the second source segment of the second ML model being a different segment than the first source segment of the first ML model, the replacement segment of the third ML model comprising an operator, a layer, or an instruction that is different than a corresponding operator, layer, or instruction of the second source segment of the first ML model;

train, via use of the machine learning service, the third ML model based on a second set of inference outputs generated by the first ML model; and cause the trained third ML model to be transmitted to the second electronic device.

* * * * *